United States Patent
He

(10) Patent No.: US 6,845,475 B1
(45) Date of Patent: Jan. 18, 2005

(54) METHOD AND APPARATUS FOR ERROR DETECTION

(75) Inventor: Duanfeng He, Farmingville, NY (US)

(73) Assignee: Symbol Technologies, Inc., Holtsville, NY (US)

(*) Notice: Subject to any disclaimer, the term of this patent is extended or adjusted under 35 U.S.C. 154(b) by 891 days.

(21) Appl. No.: 09/768,880

(22) Filed: Jan. 23, 2001

(51) Int. Cl.[7] .............................................. G06F 11/00
(52) U.S. Cl. ............................. 714/53; 714/4; 709/245
(58) Field of Search ........................... 714/53, 43, 52, 714/4, 758, 768, 784, 805, 746; 709/245, 228

(56) References Cited

U.S. PATENT DOCUMENTS

| | | | | |
|---|---|---|---|---|
| 5,907,680 A | * | 5/1999 | Nielsen | 709/228 |
| 6,038,603 A | * | 3/2000 | Joseph | 709/228 |
| 6,041,324 A | * | 3/2000 | Earl et al. | 707/9 |
| 6,092,100 A | * | 7/2000 | Berstis et al. | 709/203 |
| 6,195,707 B1 | * | 2/2001 | Minh | 709/245 |
| 6,694,333 B2 | * | 2/2004 | Oldham | 707/104.1 |
| 2003/0145112 A1 | * | 7/2003 | Keller et al. | 709/245 |
| 2004/0019697 A1 | * | 1/2004 | Rose | 709/245 |

* cited by examiner

Primary Examiner—Robert Beausoliel
Assistant Examiner—Christopher S. McCarthy
(74) Attorney, Agent, or Firm—Kirchstein, et al.

(57) ABSTRACT

Automatic detection or correction of addresses, such as Uniform Resource Locators, that are user-entered may be provided. A code that is associated with an address may be entered when an address is entered. Errors in the address may be detected and corrected based on the code. The code may be determined for an address based on the string of characters comprising that address. Reed-Solomon techniques, checksum determining techniques, or other such techniques may be used to determine a code of an address. A code may be inserted at the end of an address with a number of particular characters placed in between the code and the address to signal that a code is being used. The address, code, and code-distinguishing characters in between the code and the address may be entered by being typed in or scanned in.

20 Claims, 7 Drawing Sheets

METHOD AND APPARATUS FOR ERROR DETECTION

BACKGROUND OF THE INVENTION

This invention relates to communications systems, and more particularly, to error detection and correction in communications systems.

Some known communications systems include such a large number of unique communications addresses that the addresses that are used have become lengthy, complex, incomprehensible, etc. For example, in the Internet, where an overwhelming number of addresses may exist, such difficulties with addressing may occur. Addressing techniques that are used for Internet systems may involve using a Uniform Resource Locator ("URL") to specify a name uniquely identifying an address. Published rules and guidelines describe different URL schemes for the Internet and specify how URL's may be formed. The most common URL scheme is Hyper Text Transfer Protocol ("http"). Quite often a URL may include a lengthy combination of characters that may not be directly understandable by users. For example, a URL may include twenty or more alphanumeric characters and symbols for the address of a particular resource that may be available on the Internet. The following are URL's that are formed based on the http scheme with the related prefix punctuation mark "http://" omitted (which may typically be safely omitted in browser type applications):

www.symbol.com
www.symbol.com/products/
www.symbol.com/solutions/manufacturing/2d_label.html
www.google.com/search?q=symbol+technologies The first one of the above four addresses is typically referred to as a domain name. The second one of the four addresses is an address of a directory. For the first and second addresses, an Internet Web server may determine a filename for that address. For example, the filename may be determined to be one of the following: index.html (e.g., www.symbol.com/index.html), index.htm (e.g., www.symbol.com/products/index.htm), default.html (e.g., www.symbol.com/products/default.html), default.htm (e.g., www.symbol.com/default.htm), etc. The third address may be a complete URL with an exact filename and the fourth address may illustrate a query command in the http scheme.

A URL may be provided to a user in printed form (e.g., on a business card, in a magazine advertisement, etc.). A URL that is provided in printed form may be entered by users by typing in or optically scanning in the URL. Typing or scanning may not provide sufficient accuracy in the entered URL.

A URL that is misspelled when entered may be too difficult to correct by visual inspection or otherwise. Visual inspection may be particularly tedious and inefficient when a lengthy URL that is entered based on a printed version of the URL is checked. When a URL is entered wrong, an incorrect Web page may be reached or an error message may be displayed. Such techniques may be deficient in informing users of a particular problem in a URL and may be deficient in establishing a desired communication without further user intervention.

Error detection and correction techniques have been developed and implemented in electronic systems. Some known detection and correction techniques have been used to check communications integrity and to provide redundancy when a communication is transmitted. Such known techniques have drawbacks, such as not providing correction and detection until a communication is received at a desired destination, not detecting an error when an inaccurate address has been entered wrong by a user, etc.

SUMMARY OF THE INVENTION

In accordance with the principles of the present invention, an address of a communication resource in a communications network may be corrected automatically. A user may be provided with an opportunity to enter an address and a code that is associated with the address. The address and the code may be entered by a user by typing in the information, by scanning in the information, etc. The address and the code may be printed in a combined form which the user may treat like a normal address.

The code may be a code that is determined based on characteristics of the address. The address comprises a string of characters with byte values for each character that are used to determine an error detection/correction value for that address. The address may be a URL, such as a URL formed using an http scheme. The error detection/correction value may be a checksum of the bytes, may be determined using Reed-Solomon error correction techniques, etc. The value may be converted into a code comprising a string of characters that may be used with the address.

Errors in an address that is entered may be corrected based on the code for that address and communications may be established based on the corrected address. An address that is entered may be validated to be without errors by using the code. A user may be informed when an entered address has errors such that the errors are not correctable.

The code may be inserted in an address by, for example, inserting the code at the end of the address. Code-distinguishing characters may be inserted in between the code and the address to signal that a code is being used. The code and characters may comprise characters that are determined based on the addressing scheme used for the address so that characters or strings of characters having special meaning are avoided. The distinguishing characters may be selected to allow systems that may not be aware of the error-detection and correction scheme to safely ignore the distinguishing characters and the code that follows the characters.

Error detection and correction with the code may be performed on a user communication device, on a network communications device, etc. An application, such as a Web browser application may automatically determine that a code is being used and detect or correct errors in an address based on the code. Such applications may include applications that are executed in combination with a scanner, applications that are executed on a Web server, etc. A machine-readable medium may be encoded with a set of machine-executable instructions for detecting or correcting errors based on the code when executed according to the principles of the present invention.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which.

DETAILED DESCRIPTION OF THE INVENTION

Inaccuracies in an address of a communications resource may be detected and if desired, corrected based on a code that is associated with the address. A code that is associated with an address may be selected by applying error detection and/or correction techniques on the characters comprising that address. An address may be entered with a code when, for example, a user seeks to establish communications with a communications resource at that address. The address may have been formed based on conventional addressing techniques. A code that is entered with an address may be used to automatically repair errors in the address without requiring user intervention.

Figure 1:
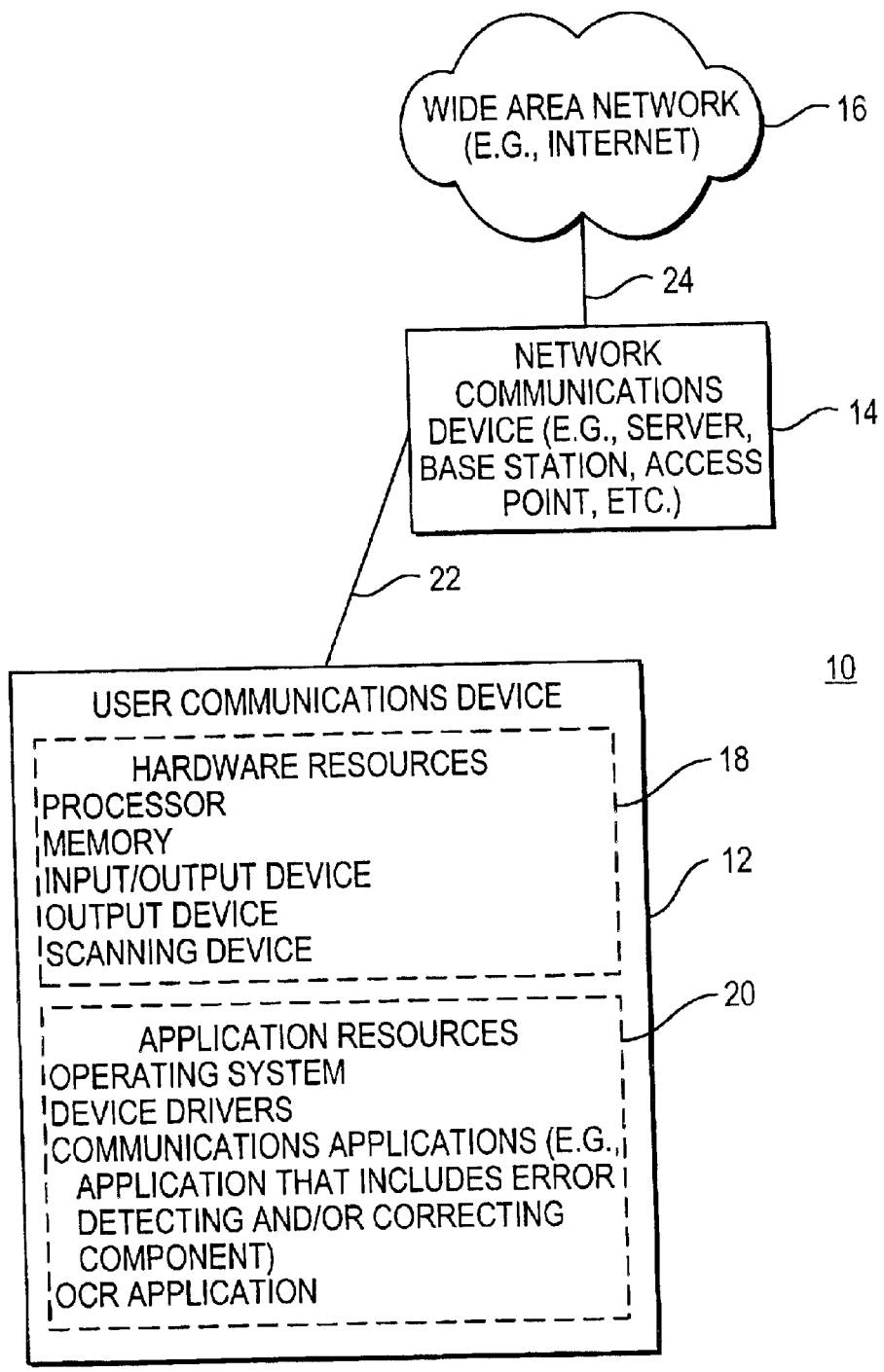
FIG. 1 is a diagram of an illustrative communications system in accordance with the present invention.

With reference now to FIG. 1, communications system 10 may include user communications device 12, network communications device 14, and wide area network 16. User communications device 12 may be a device at which a user may enter an address of a communications resource. The address may have been entered to establish communications with the communications resource at that address (e.g., transmit or receive communications packets, frames, messages, etc.). User communications device 10 may be a personal computer, mobile telephone, palm top computer, handheld scanner, computer workstation, etc. User communications device 12 may include hardware resources 18 and application resources 20. Hardware resources 18 may include a processor (e.g., a microprocessor), memory (e.g., RAM, ROM, hard-disk drive, etc.), input/output device (e.g., floppy disk drive, communications interface circuitry or interface card, etc.), output device (e.g., printer, display device, etc.), scanning device (e.g., optical scanner), etc. Application resources 20 may include an operating system, device drivers (e.g., drivers for the memory, input/output device, etc.), communications applications (e.g., an application that includes an error detecting and/or correcting component), optical character recognition ("OCR") application (e.g., an application that is used to recognize characters that are scanned using an optical scanner), etc.

Hardware resources, application resources, or a combination thereof may include sufficient functionality to at least provide a user with an opportunity to input information (e.g., an address of a communications resource) and to receive or transmit communications from devices external to user communications device 12 (e.g., communicate with an Internet Web server). A user may enter information such as an address of a communications resource (e.g., a URL) in an Internet browser application to receive information from external communications resources using communications circuitry of the user communications device.

Network communications device 14 may be a server that is in a client-server arrangement with user communications device 12, a base station (e.g., when user communications device 12 is a cellular telephone), an access point (e.g., when user communications device 12 is a remote terminal in a wireless local area network), an Internet communications switch, etc. Communications link 22 may be used to provide communications between network communications device 14 and user communications device 12 (e.g., through a wireline or wireless link that carries digital signal 5, analog signals, or a combination thereof).

If desired, network communications device 14 may be a part of wide area network 16. Wide area network 16 may be a communications network, such as the Internet that includes a substantially large number of communications resources. For example, each communications resource may be a Web page on the Internet that has an address uniquely identifying that Web page. Communications link 24 may be used to provide communications between network communications device 14 and wide area network 16 (e.g., through a wireline or wireless link that carries digital signals, analog signals, or a combination thereof).

Figure 2:
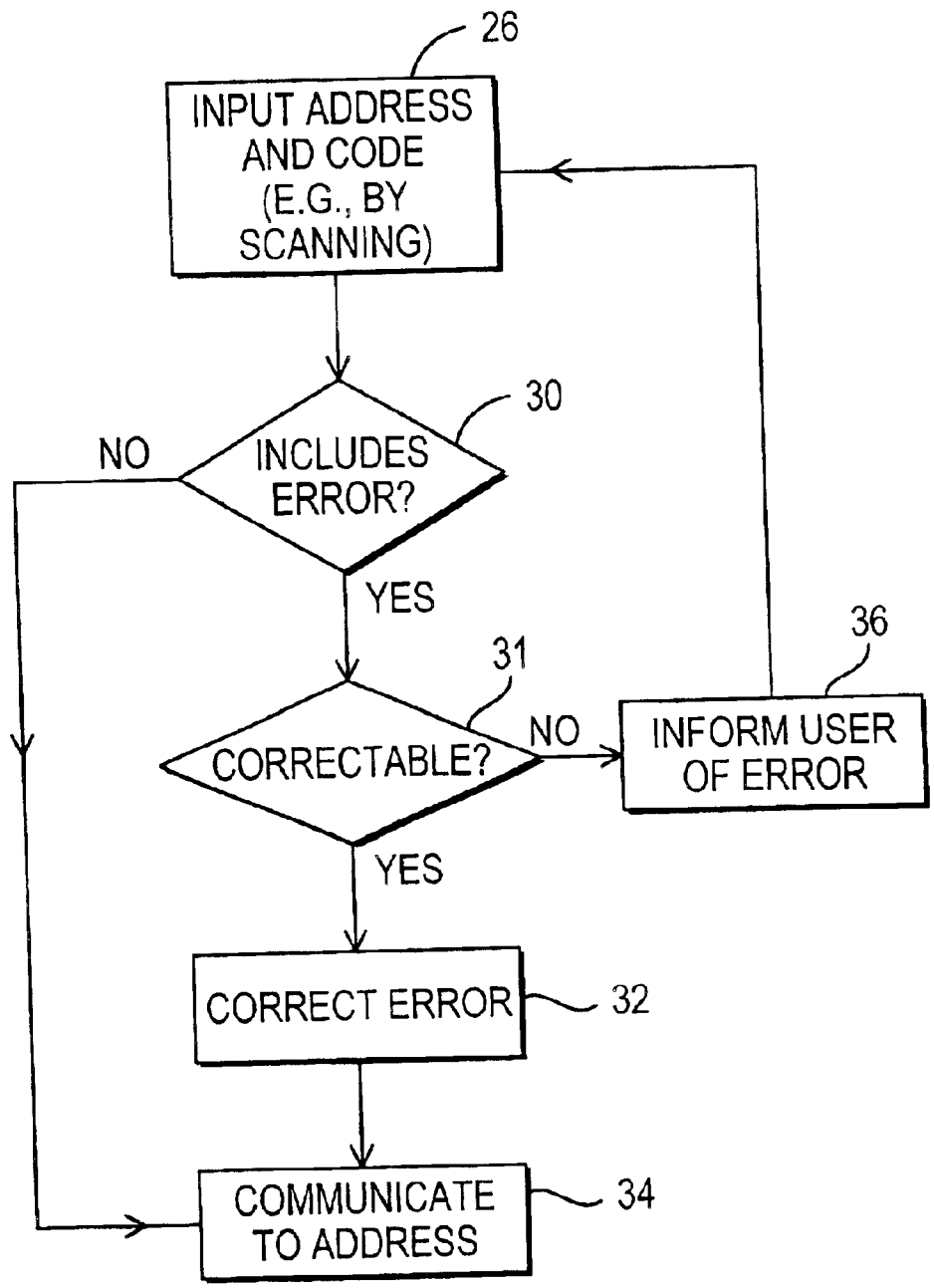
FIG. 2 is a flow chart of illustrative steps involved in providing error correction and detection of communications addresses for use in systems, such as system 10 of FIG. 1, in accordance with the present invention.

Illustrative steps used in providing error handling for user-entered addresses, such as URL's, for use in a system, such as system 10 of FIG. 1, are shown in FIG. 2. With reference now to FIG. 2, at step 26, an address of a communication resource (e.g., a URL that was formed using the http scheme) with a code embedded in the address may be entered. The address and code may be entered when a user is provided with an opportunity to enter an address for example, by allowing the user to type in an address using a keyboard or keypad, or by scanning in an address using a scanner. The address may be entered for use in a communications application, such as a browser application.

The code may be entered when an address that is associated with the code is entered. The content of the code may have been determined based on the content of the address. The code and the address may have been provided to the user together in printed form. The code may represent an error detection/correction value for the address. The error detection/correction value may have been determined based on a string of characters that comprise the address. The character string for an address may be treated as a string of bytes that may be used in calculating an error detection/correction value. For example, eight-bit values for each character in an address may be used to determine a checksum for the characters in that address. Or for example, Reed-Solomon encoding may be applied to determine an error-detection/correction value for the string of characters comprising an address. Other error detection/correction techniques may also be used to determine an error detection/correction values for addresses. An error detection value may be converted into a code comprising a character string using techniques known to one of ordinary skill in the art. The error detection/correction code may be inserted in the address (e.g., at the end of the address). The address with the error detection/correction code may sometimes be considered to be a new address.

To determine an error detection/correction value, a character string for an address, such as a complete URL that is shown above, may be used. If desired, the punctuation marks for an address, such as the punctuation mark "http://", may be included in determining an error detection/correction value. For example, the URL character string "http://www.symbol.com" may be used as the input for determining an error detection/correction value.

The error detection/correction value may be a multi-byte value with a length that may be dependent on the number of characters that are desired to be correctable. For example, an error correction value of 6 bytes may allow error correction of up to 3 characters. One way of determining an error correction value of required length from a string of bytes may be based on a Reed-Solomon error correction technique.

An error detection/correction value that is determined may be encoded into a code of characters for use with an address. The code may be partly determined based on the addressing scheme that is being used. For example, when determining a code for an address that is formed based on a URL scheme, characters that may have special meanings in the URL scheme must be avoided. Such characters may be avoided in an http URL scheme by using upper and lower English letters, the digits, the minus sign, and the plus sign (a total of 64 characters) to encode 6 bits of information with each character. The error detection/correction value that is determined may be divided into 6 bit segments and encoded.

The code may be inserted into an address and entered by a user with the address. At step 30, an address that is entered may be evaluated based on the code to determine whether the address includes an error. At step 34, communications may be allowed to be established with the address that is entered when the address is validated based on the code to be without errors.

At step 31, the address that is entered may be evaluated to determine whether the address is correctable. At step 32, an address that includes inaccuracies may be corrected based on the code. The address may be automatically corrected without user intervention. At step 36, user may be informed that an address is not correctable based on the code when the number of errors in the address are beyond the number that is correctable using the code. Communications may be established when the address has been corrected (step 34). If desired, correction of an address may occur without informing the user that a correction has been made and simply allowing appropriate communications to be established seamlessly. If desired, determining whether an address includes an error, correcting the address, informing the user of an error, and allowing communications to be performed may each be performed substantially by a communications application, an application for a scanner, or a network application at a network communications device. For example, a Web server may be used to evaluate an address based on a code for that address when the communications device at which a user entered the code and address is not equipped to make error evaluations based on the code. Or for example, a scanner application or optical character recognition application may be used to evaluate an address when an address and code are entered by a user.

Figure 3:
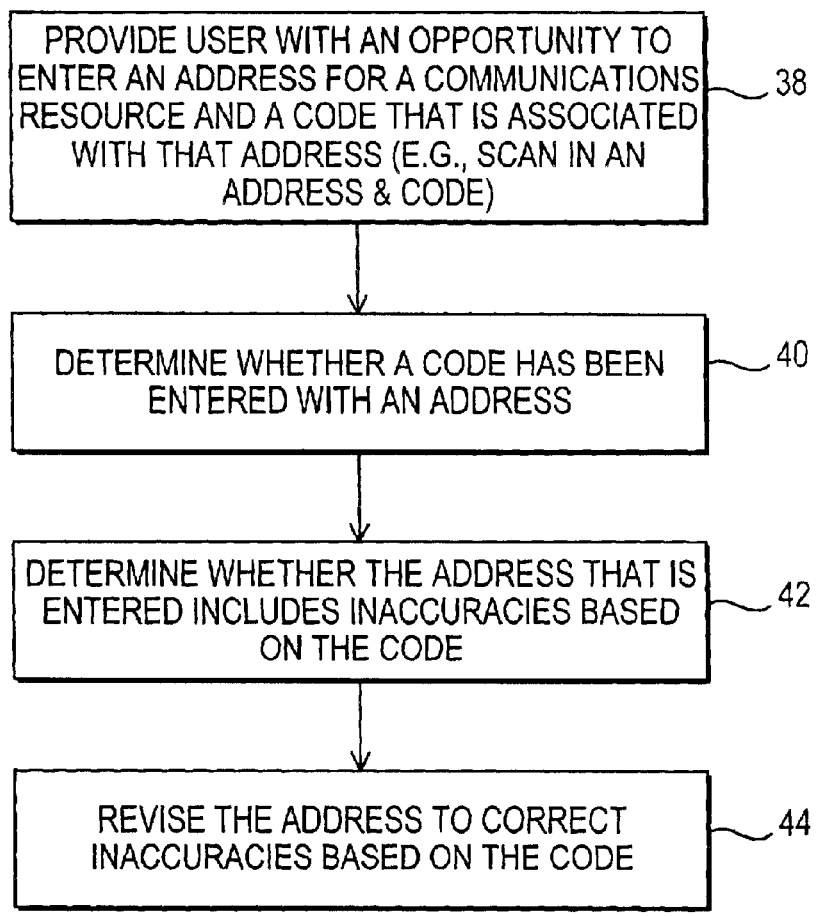
FIG. 3 is a flow chart of illustrative steps involved in providing error correction and detection that is compatible with systems that may not have error-handling capabilities in accordance with the present invention.
Figure 4:
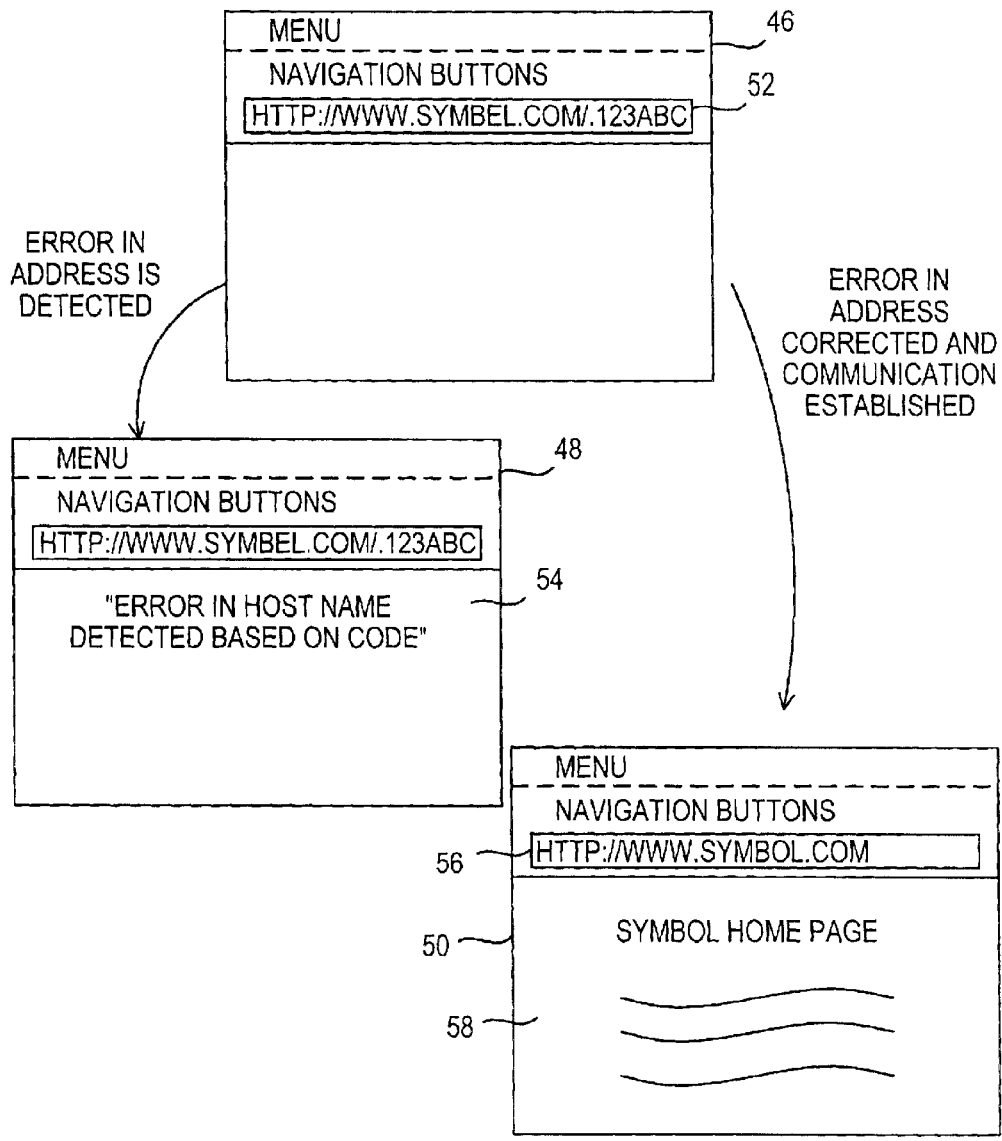
FIG. 4 is a diagram of illustrative sequence of illustrative graphical output windows that may be provided based on the illustrative steps of FIGS. 2 and 3 in accordance with the present invention.

Codes may be determined so that existing applications, which ray not have the capability to detect/correct errors based on the code for an address, may safely ignore the additional string of characters comprising the code (and/or the string used to distinguish the code from the address). If desired, applications that include the capability to error detect/correct an entered address based on the code for that address, may be configured to be operable when an address is entered without an associated code (and without the string used to distinguish the code from the address). Illustrative steps involved in providing error detection and/or correction for an address with a code for use in systems that may have different error detection or correction capabilities are shown in FIG. 3. At step 39, a user may be provided with an opportunity to enter an address of a communications resource and enter a code that may be associated with that address. For example, an address and an associated code in printed form may be scanned by a user. Or for example, a user may type in a code at the end of an address when the address is typed in on a navigation line of a browser application.

At step 40, information that has been entered may be evaluated to determine whether an address has been entered with a code. One or more characters may be inserted after an address, but before the start of a code for the address to provide a signal that a code is being used with that address. The characters inserted in between the address and the code may have been selected to be consistent with the addressing scheme of the current address so that devices (e.g., a user communications device) that are without code-based error detecting/correcting capabilities may safely ignore the code and the characters in between the code and the address.

The scheme for implanting the error correction code in a conventional address, such as a normal URL, is designed to satisfy two goals. Firstly, applications that are not aware of the scheme are to behave normally when a code is used for an address in those applications. For example, if neither a browser application nor a Web server application is aware of the scheme, both applications should behave normally when the scheme is used. That is, the correct Web page is delivered when there are no errors in the address portion of the input irrespective of a code and/or distinguishing characters that may have been entered with the address.

Secondly, if at least one application (e.g. a browser application or a Web server application) is aware of the scheme, that application is to easily identify the code from the combined input that contains the original address and the error correction code. For example, a browser application may operate normally and safely ignore the code and/or distinguishing characters, while a Web server application is to identify the code and properly use the information.

It is to be understood that an actual error correction code, its content and its length, may depend on the error correction technique used and the encodation scheme that is used, and above all, must vary according to the input string of the address. The illustration below that uses the assumed illustrative error correction code "123ABC" serves to demonstrate how to insert the code into an original URL such that conventional browser applications and server applications may ignore the code. The four URLs that are shown above are shown below with modifications to show code-insertion techniques. In all cases, two extra characters are inserted in front of the encoded error correction string "123ABC" to distinguish the code from the address.

www.symbol.com/?123ABC
www.symbol.com/products/?123ABC
www.symbol.com/solutions/manufacturing/_2d_label.htm/?123ABC
www.google.com/search/.123ABC?q=symbol+technologies In all four URL examples, eight additional characters comprising the string "123ABC," the forward slash mark, and the dot or the question mark, are character strings that are safely passed on by conventional Web browser applications and communications protocols, and are safely ignored by conventional Web server applications and communications protocols. The choice of using either a "slash-dot mark" or "slash-question mark" is based on the syntax of the URL. If the original URL does not contain a question mark, then the "slash-question mark" can be used; if the URL already contains a question mark, then the "slash-dot mark" should be used.

Based on existing Internet protocols it has been determined that the use of a question mark signifies to a server that what follows is a string for a query. The query string and what is in front of the query string may be used by a Web server application to identify what page to send to the user. A Web server application may keep the query string for the page to use internally. In cases where a ready-made (or technically static) page is to be displayed, the query string will not be processed. The use of a combination of a slash and a question mark can be used with embedded codes as shown in the first three examples of URLs with embedded codes that are given above.

In the last example above, a question mark was already in the address, and the addition of another question mark in the URL may cause confusion. In such situations the "slash-dot mark" for the error corrections code may be used. An original URL that already includes a question mark does not typically include a slash mark with a question mark to form a "slash-question mark" combination. Typically, URLs that include a question mark contain a program file name immediately before the question mark, and contain a query string following the question mark that is to be used by the program with that filename when the program is executed. When a "slash-dot mark" is used with an address, any additional string after the mark are typically treated as "path-info", and are generally ignored.

For systems that are aware of the error correction scheme, the recognition of the error correction code may be easy. In the first case, a "slash-question mark" is easily identified as the signature for the scheme because a query string that follows a "slash-question mark" is generally not useful when there is no file name for a program that is to be executed with the string. In the second case, although in theory the dot mark in a "slash-dot mark" may be the leading part of a file name, normal conventions used for naming files are not known to typically use the "dot" or "slash-dot" mark in naming files. For example in UNIX based systems, file names starting with a dot mark are meant to be invisible to regular users such as typical Web page users. In other known operating systems, a dot mark is generally used to separate portions of a file name.

At step 42, an address that has been entered may be evaluated based on the code that is entered with the address to determine whether the address includes inaccuracies. At step 44, an address that includes inaccuracies may be revised based on the code to correct inaccuracies. Steps 38, 40, 42, and 44 may be performed substantially at a scanner application, communications application, network communications device, etc.

Illustrative graphical output navigation windows that may be generated by an output device of a user communications device may be provided based on the illustrative steps of FIGS. 2 and 3. Navigation window 46 may include an area in which a user may be provided with an opportunity to enter an address to access a resource for that address. A user may have entered an address that includes a misspelling of the word "symbol" with a code "123ABC" that is associated with the address and code-distinguishing characters "/?." (e.g., "http://www.symbel.com/?.123ABC"). In response to entering the misspelled address, navigation window 48 may be provided that includes text 54 informing the user that an error has been detected based on the code. When an error correcting code is being used, navigation window 50 may be provided that includes corrected address 56 that is determined based on the code and information 58 from the communications resource at that corrected address.

Figure 5:
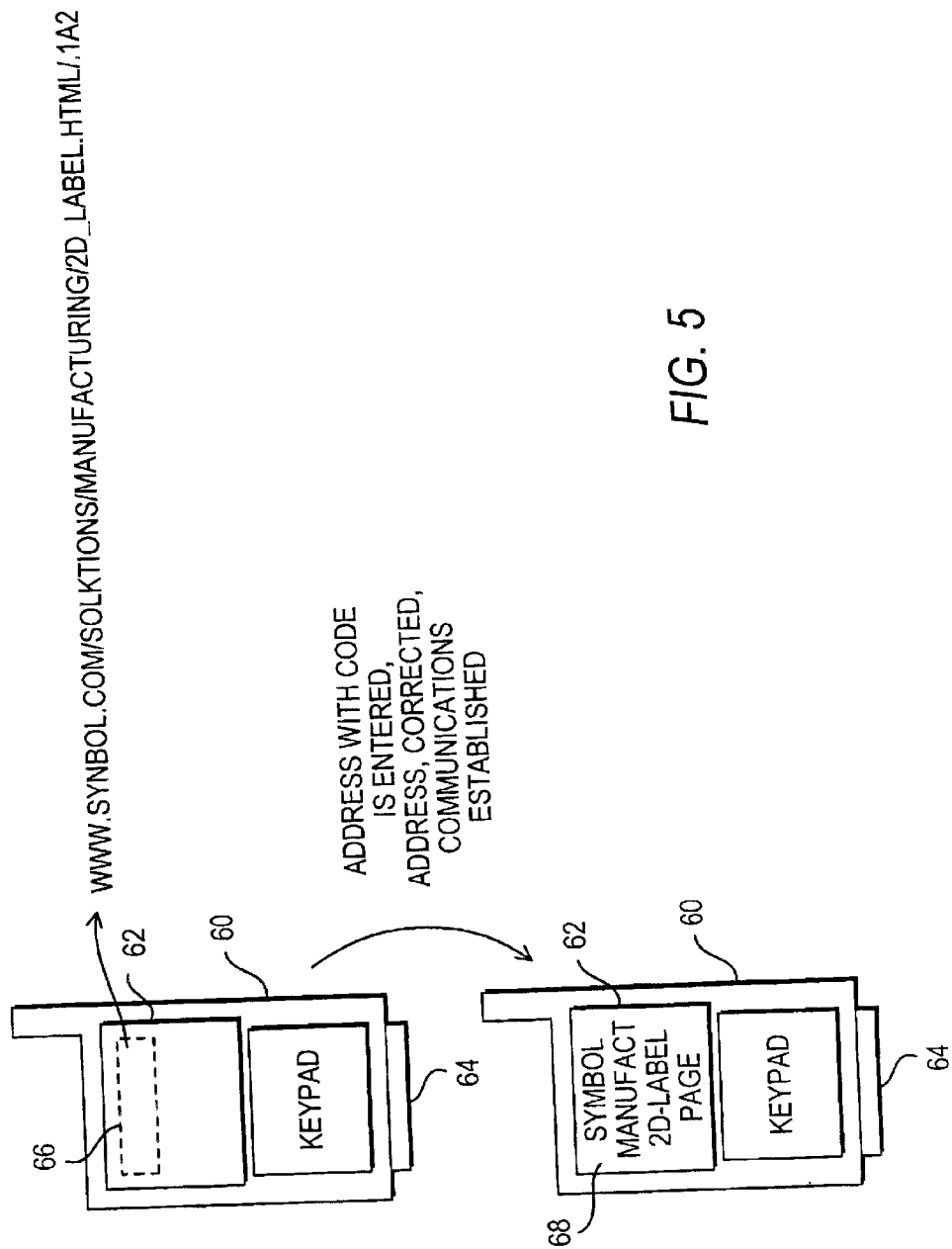
FIG. 5 is a diagram of an illustrative sequence of activity on an illustrative user communication device that may be provided based on the illustrative steps of FIGS. 2 and 3 in accordance with the present invention.

Illustrative user communications device 60 of FIG. 5 may be provided based on the illustrative steps of FIGS. 2 and 3. If desired, communications device 60 may include a scanner 64 that may be configured to scan printed media, such as a business card that includes an address, code, and code distinguishing characters. A user may be provided with an opportunity to type in or scan in an address, code, and code-distinguishing characters into area 66 of graphical output device 62 of user communications device 60. The address that is entered may be a lengthy string of characters with the words "solutions" and "symbol" misspelled. The code that is associated with the address may be "1A23AB" and the mark "/?." may be the code-distinguishing characters. User communications device 60 may correct the address based on the code, may establish communications based on the corrected address, and may provide information in user output device 62 to a user from a resource at the corrected address when the code, address, and distinguishing characters have been entered. User communications device 60 may be a cell phone, a remote terminal, personal digital assistant, etc.

Figure 6:
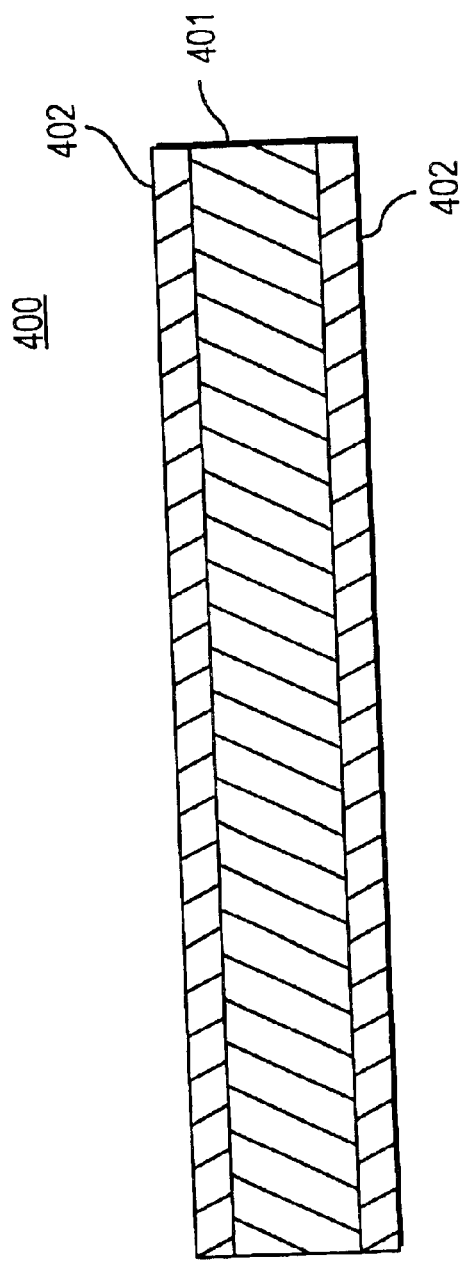
FIG. 6 is a cross-sectional view of a magnetic data storage medium encoded with a set of machine-executable instructions for performing the methods according to the present invention.

FIG. 6 presents a cross-section of a magnetic data storage medium 400 which can be encoded with a machine executable program that can be carried out by equipment such as user communications device 10 of FIG. 1 to implement methods discussed in connection with FIGS. 2–5. Medium 400 can be floppy diskette or hard disk, having a suitable substrate 401., which may be conventional, and a suitable coating 402, which may be conventional, on one or both sides, containing magnetic domains (not visible) whose polarity or orientation can be altered magnetically. Medium 400 may also have an opening (not shown) for receiving the spindle of a disk drive or other data storage device.

The magnetic domains of coating 402 of medium 400 are polarized or oriented so as to encode, in manner which may be conventional, a machine-executable program such as those described above in connection with FIGS. 2–5, for execution by equipment such as user communications device 10 of FIG. 1.

Figure 7:
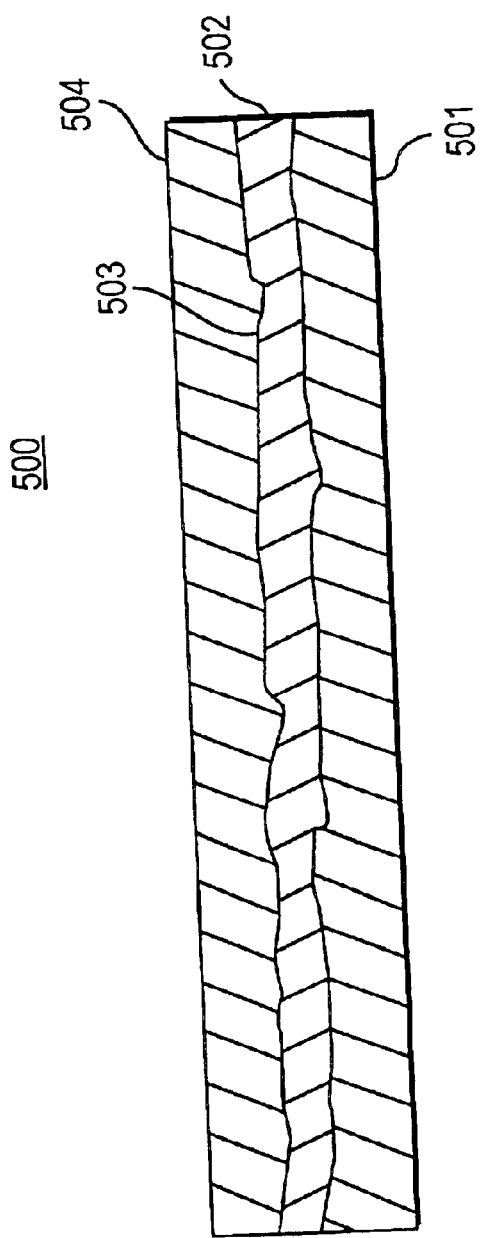
FIG. 7 is a cross-sectional view of an optically readable data storage medium encoded with a set of machine executable instructions for performing the methods according to the present invention.

FIG. 7 shows a cross-section of an optically-readable data storage medium 500 which also can be encoded with such a machine-executable program, which can be carried out by equipment such as user communications device 10 of FIG. 1. Medium 500 can be a conventional compact disk read only memory (CD-ROM) or a rewritable medium such as a CD-R or CD-RW disk or a magneto-optical disk which is optically readable and magneto-optically writeable. Medium 500 preferably has a suitable substrate 501, which may be conventional, and a suitable coating 502, which may be conventional, usually on one side of substrate 501.

In the case of a CD-ROM, as is well known, coating 502 is reflective and is impressed with a plurality of pits 503 to encode the machine-executable program. The arrangement of pits is read by reflecting laser light off the surface of coating 502. A protective coating 504, which preferably is substantially transparent, is provided on top of coating 502.

In the case of magneto-optical disk, as is well known, coating 502 has no pits 503, but has a plurality of magnetic domains whose polarity or orientation can be changed magnetically when heated above a certain temperature, as by a laser (not shown). The orientation of the domains can be read by measuring the polarization of laser light reflected from coating 502. The arrangement of the domains encodes the program as described above.

Thus, automatic error detection and correction of communications addresses may be accomplished based on a code that is determined based on characteristics of the address and entered when the address is entered. Code-distinguishing characters may be used to allow the code to be distinguished from the address while allowing conventional applications that may be without the capability to handle errors based on a code to safely ignore the distinguishing characters and the code. Difficulties in using lengthy addresses are automatically alleviated either by informing the user of an error or by seamlessly correcting the error and providing communications based on the corrected address.

The foregoing is merely illustrative of the principles of this invention and various modifications can be made by those skilled in the art without departing from the scope and spirit of the invention.

What is claimed is:

1. A method of detecting errors in communications resource addresses, comprising:
   providing a user with an opportunity to enter a code that is associated with an address of a communications resource when the address is entered by the user; and
   determining whether the address that has been entered includes an error based on the code.

2. The method of claim 1 further comprising correcting the address that has been entered based on the code in response to said determining.

3. The method of claim 1 wherein said providing comprises providing the address to be an Internet resource address.

4. The method of claim 1 wherein said providing comprising providing the code based on a sequence of text strings that comprises the address.

5. The method of claim 1 wherein said providing comprises providing the user with an opportunity to type the address and the code to enter the address and the code.

6. The method of claim 1 wherein said providing comprising optically scanning text representing the address and the code to enter the address and the code.

7. The method of claim 1 wherein said providing comprising providing the opportunity at a personal computer on which a communications application for communicating with communications resources having different addresses has been implemented.

8. The method of claim 7 wherein said determining comprising determining at the personal computer whether the address includes an error.

9. The method of claim 7 wherein said determining comprising determining at a server computer that is in a client-server arrangement with the personal computer whether the address includes an error.

10. The method of claim 1 wherein said providing comprising providing the opportunity at a hand-held portable device.

11. A computer-readable storage medium encoded with a set of computer-executable instructions to perform a method of detecting errors in communications resource addresses, comprising: providing a user with an opportunity to enter a code that is associated with an address of a communications resource when the address is entered by the user, and determining whether the address that has been entered includes an error based on the code.

12. The computer-readable storage medium of clam 11, wherein said method further comprising correcting the address that has been entered based on the code in response to said determining.

13. The computer-readable storage medium of claim 11 wherein said providing comprises providing the address to be an Internet resource address.

14. The computer-readable storage medium of claim 1 wherein said providing comprising providing the code based on a sequence of text strings that comprises the address.

15. The computer-readable storage medium of claim 1 wherein said providing comprises providing the user with an opportunity to type the address and the code to enter the address and the code.

16. The computer-readable storage medium of claim 1 wherein said providing comprising optically scanning text representing the address and the code to enter the address and the code.

17. The computer-readable storage medium of claim 1 wherein said providing comprising providing the opportunity at a personal computer on which a communications application for communicating with communications resources having different addresses has been implemented.

18. The computer-readable storage medium of claim 17 wherein said determining comprising determining at the personal computer whether the address includes an error.

19. The computer-readable storage medium of claim 17 wherein said determining comprising determining at a server computer that is in a client-server arrangement with the personal computer whether the address includes an error.

20. The computer-readable storage medium of claim 11 wherein said providing comprising providing the opportunity at a hand-held portable device.

* * * * *